May 6, 1969
J. W. DAVISON
3,442,970
HYDROCARBON CONVERSION
Filed Feb. 7, 1966
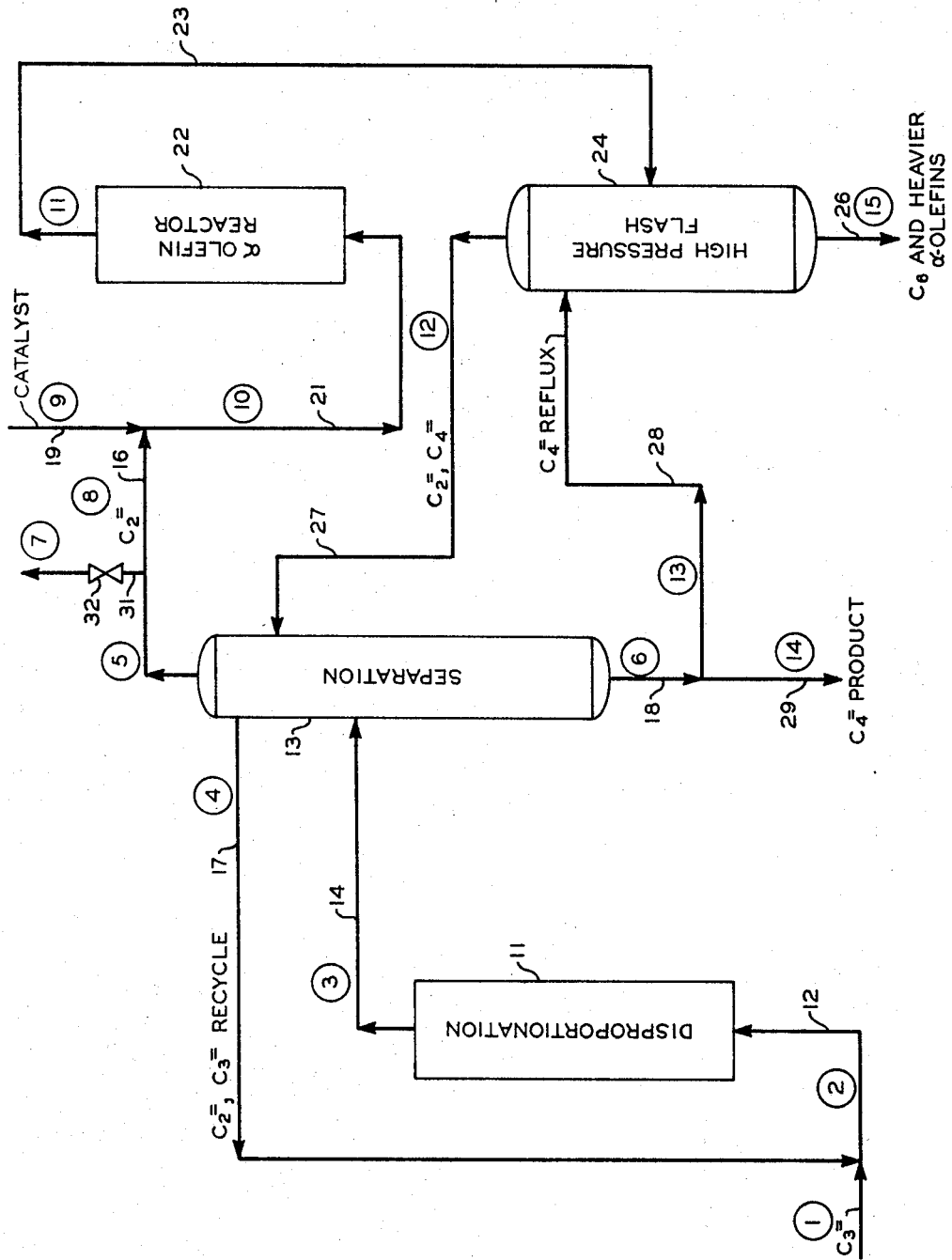
INVENTOR
J.W. DAVISON
BY *Young & Quigg*
ATTORNEYS United States Patent Office 3,442,970
Patented May 6, 1969

3,442,970
HYDROCARBON CONVERSION
Joseph W. Davison, Bartlesville, Okla., assignor to Phillips Petroleum Company, a corporation of Delaware
Filed Feb. 7, 1966, Ser. No. 525,523
Int. Cl. C07c *3/20, 3/62, 11/04*
U.S. Cl. 260—683.15           1 Claim

ABSTRACT OF THE DISCLOSURE

An integrated process for propylene disproportionation and the production of alpha olefins wherein ethylene produced by disproportionating propylene is polymerized to produce the alpha olefins which are separated in a high pressure flash zone from $C_4$ and lighter olefins which are returned to the separation zone for the disproportionation effluent and reflux is provided for the high pressure flash zone from the bottoms product of the separation zone.

---

This invention relates to hydrocarbon conversion. In one aspect, the invention relates to an integrated process for propylene disproportionation and the production of alpha-olefins. In another aspect, the invention relates to converting lower molecular weight olefins to higher molecular weight olefins. In another aspect, the invention relates to the production of butene and higher molecular weight olefins from propylene.

An object of my invention is to disproportionate propylene, polymerize produced ethylene to produce long chain alpha-olefins and recover butene produced by the disproportionation.

Another object of my invention is to provide a highly efficient integrated propylene disproportionation and alpha-olefin producing process.

Other aspects, objects and the advantages of my invention are apparent in the written description, the drawing and the claims.

According to my invention, propylene is disproportionated, at least a portion of the ethylene produced from the disproportionation polymerized to produce alpha-olefins, the effluent of the ethylene polymerization flashed in a high pressure flash zone in which butene also produced by the disproportionation is used as a recycle. A portion of the ethylene produced in the disproportionation step along with unreacted propylene can be recycled to the disproportionation step, while a portion of the butene produced can be recovered as a product, and ethylene and butene from the high pressure flash zone recycled to the separation step for the disproportionation effluent.

In this application, disproportionation is used to mean the conversion of a hydrocarbon into similar hydrocarbons of higher and lower numbered carbon atoms per molecule. Such an operation is used in many instances. For example, a more plentiful hydrocarbon can be converted to a less plentiful and, therefore, more valuable hydrocarbon. When propylene is disproportionated, approximately equimolar quantities of ethylene and butenes are produced.

Disproportionation can be accomplished using any catalyst suitable for the reaction including, for example, a catalyst comprising molybdenum oxide and aluminum oxide, a catalyst comprising tungsten oxide and silica, a catalyst comprising molybdenum hexacarbonyl or tungsten hexacarbonyl and alumina, etc. Operative and preferred conditions for disproportionation vary with the catalyst selected. Details of some suitable disproportionation processes are given in copending application Ser. No. 307,371, Heckelsberg, filed Sept. 9, 1963 and now abandoned; Ser. No. 312,209, Banks, filed Sept. 27, 1963, now Patent No. 3,261,879; Ser. No. 336,624, Heckelsberg, filed Jan. 9, 1964, now Patent No. 3,340,322; and Ser. No. 94,996, Banks, filed Mar. 13, 1961.

Alpha olefins can be polymerized to produce higher molecular weight alpha olefins by contacting a lower molecular weight olefin with an aluminum alkyl such as aluminum triethyl at suitable operating conditions. When the lower molecular weight olefin is ethylene, a straight chain alpha olefin is produced. The polymerization reaction can be conducted continuously by maintaining suitable conditions including the proper mol ratio of olefins to aluminum alkyl and conditions of temperature, pressure, etc., such that the higher boiling olefins are produced.

In the drawing, propylene is fed to disproportionation reactor 11 through pipe 12. The effluent from reactor 11 is passed to a separator 13 through pipe 14. In separator 13 a separation is made whereby a stream comprising predominantly ethylene is removed overhead through pipe 16, a stream comprising substantially all of the unreacted propylene together with a portion of the produced ethylene is recycled through pipe 17 to inlet pipe 12 and a bottoms product comprising predominantly butenes is removed through pipe 18. The ethylene produced through pipe 16 is mixed with a suitable catalyst such as, for example, triethylaluminum, which enters through pipe 19 and the reaction mixture passed through pipe 21 to alpha olefin reactor 22. The effluent from reactor 22 is passed through pipe 23 to a high pressure flash vessel 24. From vessel 24 a bottoms stream is removed containing $C_6$ and heavier alpha olefins. Ethylene and butene are removed through pipe 27 and returned to separator 13. Reflux is provided for the upper trays of flash vessel 24 through pipe 28, while excess butenes are removed through pipe 29 as a butenes product which can be used, for example, in a butene dehydrogenation operation to produce butadiene. If some ethylene production is desired, it can be removed from pipe 16 through pipe 31 by opening valve 32.

Although not shown, the combination of steps of this invention are unitized to conserve heat, materials and equipment by the use of suitably located heat exchangers, separation stages, and recycle streams. Other equipment and process steps can be utilized as desired or necessary including, for example, pumps, valves, separators, heaters, coolers, catalyst separators, or other separation and recycle steps, etc. Any suitable design can be used for the various elements of the disclosed apparatus. For example, separator 13 suitably is a fractional distillation column. Conditions are selected within those suitable for the disproportionation and alpha olefin reaction and for the separation in separator 13. The high pressure flash vessel 24 preferably is maintained at a pressure of 450 p.s.i.g.

In an example according to my invention, reactor 11 is maintained at a temperature of 800° F. and 425 p.s.i.g., reactor 22 is maintained at 425° F. and 8,500 p.s.i.g. The effluent from reactor 22 is flashed adiabatically to a pressure of 450 p.s.i.g. in flash vessel 24. The effluent from reactor 11 and the overhead from flash vessel 24 are fed to separator 13 as shown. Separator 13 is operated at a pressure of 425 p.s.i.g. with a temperature of 160° F. at the top and 280° F. at the bottom.

The compositions of the flow streams at various points in the process are given in the following table, in which the numbers correspond with the circled numbers in the drawing.

It will be noted that no reflux to flash vessel 24 was utilized in this example. In other specific operations, such reflux may be desirable or necessary and can be supplied in suitable amounts for proper operation of flash vessel 24.

TABLE.—COMPOSITION IN LB./LB. OF PROPYLENE ENTERING REACTOR 11

| Components | 1 | 2 | 3 | 4 | 5 | 6 | 7* | 8 | 9 | 10 | 11 | 12 | 13 | 14 | 15 |
|---|---|---|---|---|---|---|---|---|---|---|---|---|---|---|---|
| Ethylene | | 0.064 | 0.179 | 0.064 | 0.230 | | | 0.230 | | 0.230 | 0.115 | 0.115 | | | |
| Propylene | 0.360 | 1.000 | 0.640 | 0.640 | | | | | | | | | | | |
| Butene | | | 0.241 | | | 0.257 | | | | | 0.015 | 0.016 | 0 | 0.257 | |
| Pentene | | | 0.004 | | | 0.004 | | | | | | | | 0.004 | |
| Hexene | | | | | | | | | | | 0.019 | | | | 0.019 |
| Octene | | | | | | | | | | | 0.018 | | | | 0.018 |
| Decene | | | | | | | | | | | 0.016 | | | | 0.016 |
| Dodecene | | | | | | | | | | | 0.014 | | | | 0.014 |
| Tetradecene | | | | | | | | | | | 0.012 | | | | 0.010 |
| Hexadecene and heavier olefins | | | | | | | | | | | 0.020 | | | | 0.023 |
| TEA Catalyst | | | | | | | | | 0.0003 | | 0.0003 | | | | 0.002 |

*No ethylene removed.

Reasonable variation and modification are possible within the scope of my invention which sets forth an integrated process for propylene disproportionation and ethylene polymerization to produce alpha olefins.

I claim:

1. A process which comprises:
   disproportionating propylene to produce ethylene and butene;
   separating the effluent from the disproportionation step in a separation zone to produce a first stream comprising ethylene with substantially no heavier olefins, a second stream comprising propylene and a small amount of ethylene, and a third stream comprising butene;
   polymerizing at least a portion of said ethylene in said first stream to produce alpha olefins having 12 to 20 carbon atoms per molecule;
   flashing the product of said ethylene polymerization in a high pressure flash zone and recovering alpha olefins therefrom;
   returning $C_4$ and lighter olefins from said high pressure flash zone to said separation zone;
   and refluxing said high pressure flash zone with a portion of the butene of said third stream.

References Cited

UNITED STATES PATENTS 2,198,937  4/1940  Frey et al. _____ 260—683.15
3,330,882  7/1967  Albright _____ 260—683.15

PAUL M. COUGHLAN, Jr., *Primary Examiner.*

C. E. SPRESSER, *Assistant Examiner.*

U.S. Cl. X.R.

260—683